(12) United States Patent
Wu

(10) Patent No.: US 10,492,101 B2
(45) Date of Patent: Nov. 26, 2019

(54) METHOD FOR ENHANCING PROCESSING CAPABILITY OF BASE STATION, BASEBAND DEVICE, BASE STATION, AND SYSTEM

(71) Applicant: Huawei Technologies Co., Ltd., Shenzhen (CN)

(72) Inventor: Libo Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 221 days.

(21) Appl. No.: 15/619,131

(22) Filed: Jun. 9, 2017

(65) Prior Publication Data

US 2017/0280356 A1 Sep. 28, 2017

Related U.S. Application Data

(63) Continuation of application No. PCT/CN2015/096471, filed on Dec. 4, 2015.

(30) Foreign Application Priority Data

Dec. 12, 2014 (WO) ............... PCT/CN2014/093693

(51) Int. Cl.
*H04W 28/08* (2009.01)
*H04B 7/26* (2006.01)
(Continued)

(52) U.S. Cl.
CPC ............ *H04W 28/08* (2013.01); *H04B 7/26* (2013.01); *H04L 69/08* (2013.01);
(Continued)

(58) Field of Classification Search
CPC ............. H04W 28/08; H04W 28/0278; H04W 72/1252; H04L 69/08
See application file for complete search history.

(56) References Cited

U.S. PATENT DOCUMENTS

| | | | | |
|---|---|---|---|---|
| 9,516,521 | B2 * | 12/2016 | Sirotkin | ............... H04W 24/02 |
| 2009/0221319 | A1 * | 9/2009 | Lan | ...................... H04W 88/10 |
| | | | | 455/550.1 |

(Continued)

FOREIGN PATENT DOCUMENTS

| CN | 101232654 A | 7/2008 |
|---|---|---|
| CN | 101505500 A | 8/2009 |

(Continued)

OTHER PUBLICATIONS

"Network Functions Virtualisation (NFV); Management and Orchestration," ETSI GS NFV-MAN 001, V1.1.1, pp. 1-184, XP14235740A, European Telecommunications Standards Institute, Sophia Antipolis, France (Dec. 2014).

(Continued)

*Primary Examiner* — George C Atkins
*Assistant Examiner* — Ryan C Kavleski
(74) *Attorney, Agent, or Firm* — Leydig, Voit & Mayer, Ltd.

(57) ABSTRACT

Embodiments of the present invention provide a method for enhancing a processing capability of a base station, a baseband device, a base station, and a system. The method includes: receiving, by a base station, data of a terminal; performing control plane protocol processing on the terminal by using a first BBP, and performing all or part of data transmission protocol processing on the data of the terminal by using a second BBP; and sending processed data of the terminal. In this way, another BBP shares all or part of data transmission protocol processing for a terminal that accesses a BBP, to enhance a processing capability of the base station on the whole, thereby implementing inter-board load balancing.

17 Claims, 9 Drawing Sheets

(51) Int. Cl.
*H04W 88/08* (2009.01)
*H04L 29/06* (2006.01)
*H04W 28/02* (2009.01)
*H04W 72/12* (2009.01)

(52) U.S. Cl.
CPC ... *H04W 28/0278* (2013.01); *H04W 72/1252* (2013.01); *H04W 88/08* (2013.01)

(56) References Cited

U.S. PATENT DOCUMENTS

| | | | |
|---|---|---|---|
| 2013/0128861 A1 | 5/2013 | Zhou et al. | |
| 2013/0170454 A1 | 7/2013 | Zhou et al. | |
| 2014/0269322 A1* | 9/2014 | Li | H04W 28/08 370/236 |
| 2014/0293784 A1 | 10/2014 | Haberland | |
| 2014/0328178 A1* | 11/2014 | Haberland | H04W 28/08 370/235 |
| 2015/0304889 A1 | 10/2015 | Qian et al. | |
| 2017/0163342 A1* | 6/2017 | Testa | H04W 48/00 |

FOREIGN PATENT DOCUMENTS

| | | |
|---|---|---|
| CN | 102404849 A | 4/2012 |
| CN | 102647804 A | 8/2012 |
| CN | 102656936 A | 9/2012 |
| CN | 102668613 A | 9/2012 |
| CN | 102918909 A | 2/2013 |
| CN | 103096473 A | 5/2013 |
| CN | 103108334 A | 5/2013 |
| CN | 103379527 A | 10/2013 |
| CN | 103841591 A | 6/2014 |
| CN | 103841605 A | 6/2014 |
| CN | 104080136 A | 10/2014 |
| KR | 20140099483 A | 8/2014 |
| WO | 2013093462 A1 | 6/2013 |
| WO | 2013123670 A1 | 8/2013 |
| WO | 2014101674 A1 | 7/2014 |

OTHER PUBLICATIONS

CN/201580001056.1, Office Action and Search Report, dated Feb. 12, 2019.

* cited by examiner

METHOD FOR ENHANCING PROCESSING CAPABILITY OF BASE STATION, BASEBAND DEVICE, BASE STATION, AND SYSTEM

CROSS-REFERENCE TO RELATED APPLICATIONS

This application is a continuation of International Application No. PCT/CN2015/096471, filed on Dec. 4, 2015, which claims priority to International Patent Application No. PCT/CN2014/093693, filed on Dec. 12, 2014. The disclosures of the aforementioned applications are hereby incorporated by reference in their entireties.

TECHNICAL FIELD

Embodiments of the present invention relate to the field of communications technologies, and in particular, to a method for enhancing a processing capability of a base station, a baseband device, a base station, and a system.

BACKGROUND

In a mobile communications system, a terminal needs to establish, through a wireless network, a connection to an external network, for example, the Internet, so as to enjoy a service from a third party application through the external network.

As shown in FIG. 1, the wireless network mainly includes a radio access network (RAN) 111 and a core network (CN) 112, where a function of managing a radio resource is mainly executed in the RAN 111, and a function related to a service and an application is mainly executed in the core network 112. It can be seen that the RAN 111 is a bridge for connecting a terminal 120 to the core network 112.

As communications technologies develop, a quantity of mobile terminals continuously increases, and a quantity of mobile services also increases quickly, which pose a great challenge to a processing capability on a RAN side. Using a Long Term Evolution (LTE) system as an example, a processing capability of a base station on the RAN side, for example, an evolved node B (eNB), is mainly reflected by a processing capability of a baseband processing board (BBP). However, the processing capability of the BBP is limited, and when the BBP undertakes service processing of a hotspot cell or is in some big event scenarios, the capability is often insufficient. A big event refers to a scenario, such as New Year, a music festival, or a filmfest, in which some particular events cause a sudden rise in service traffic.

Currently, a processing manner for an inadequate BBP processing capability is to perform traffic control, which reduces user experience.

SUMMARY

In view of this, embodiments of the present invention provide a method for enhancing a processing capability of a base station, a baseband device, a base station, and a system, to enhance user experience.

According to a first aspect, a method for enhancing a processing capability of a base station is provided, applied to a base station including multiple baseband processing boards (BBPs), where the method includes: receiving, by the base station, data of a terminal; performing control plane protocol processing on the terminal by using a first BBP, and performing all or part of data transmission protocol processing on the data of the terminal by using a second BBP; and sending processed data of the terminal.

In a first possible implementation manner of the first aspect, in the process of performing control plane protocol processing on the terminal by using a first BBP, and performing all or part of data transmission protocol processing on the data of the terminal by using a second BBP, the method further includes: scheduling the terminal by using the first BBP.

With reference to the first possible implementation manner of the first aspect, in a second possible implementation manner of the first aspect, the scheduling the terminal by using the first BBP, and the performing all or part of data transmission protocol processing on the data of the terminal by using a second BBP include: transferring, by the second BBP, a notification message to the first BBP, where the notification message is used to notify the first BBP that a data transmission queue is not null; scheduling, by the first BBP, the terminal according to the notification message, and transferring a scheduling result to the second BBP; constituting, by the second BBP, a packet data unit according to the scheduling result; and transferring, by the second BBP, the constituted packet data unit to a physical layer of the second BBP, to send the packet data unit through the physical layer of the second BBP, or transferring the constituted packet data unit to the first BBP, to send the packet data unit through a physical layer of the first BBP.

With reference to the first aspect or either of the first and second possible implementation manners of the first aspect, in a third possible implementation manner of the first aspect, before the performing control plane protocol processing on the terminal by using a first BBP, and performing all or part of data transmission protocol processing on the data of the terminal by using a second BBP, the base station performs data transmission protocol processing on data of the terminal by using the first BBP; and when it is detected that a load of the first BBP is greater than or equal to a first load threshold, performs all or part of data transmission protocol processing on data of the terminal by using the second BBP, where a load of the second BBP is less than or equal to a second load threshold.

With reference to the third possible implementation manner of the first aspect, in a fourth possible implementation manner of the first aspect, the method further includes: converting, into scheduling resources of the first BBP, all or part of hardware resources that are used by the first BBP to perform data transmission protocol processing on the data of the terminal.

With reference to the first aspect or either of the first and second possible implementation manners of the first aspect, in a fifth possible implementation manner of the first aspect, the terminal is a terminal that initially accesses the first BBP or is handed over to the first BBP.

With reference to the first aspect or either of the first and second possible implementation manners of the first aspect, in a sixth possible implementation manner of the first aspect, a same cell is deployed on the first BBP and the second BBP, the terminal is in the same cell, and the first BBP and the second BBP undertake together data transmission protocol processing for all terminals in the same cell.

With reference to the sixth possible implementation manner of the first aspect, in a seventh possible implementation manner of the first aspect, the first BBP and the second BBP undertake together layer 2 protocol processing for all the terminals in the same cell.

With reference to the first aspect or any one of the first to seventh possible implementation manners of the first aspect, in an eighth possible implementation manner of the first aspect, the performing control plane protocol processing on the terminal by using a first BBP includes: performing layer 3 protocol processing for the terminal by using the first BBP; and the performing all or part of data transmission protocol processing on the data of the terminal by using a second BBP includes: performing one or both of layer 2 and layer 1 protocol processing on the data of the terminal by using the second BBP.

With reference to the eighth possible implementation manner of the first aspect, in a ninth possible implementation manner of the first aspect, the data transmission protocol processing performed on the data of the terminal by using the second BBP includes layer 2 protocol processing.

With reference to the first aspect or any one of the first to ninth possible implementation manners of the first aspect, in a tenth possible implementation manner of the first aspect, the data of the terminal is uplink data or downlink data.

According to a second aspect, a baseband device is provided, including multiple baseband processing boards (BBPs), where the multiple BBPs include a first BBP and a second BBP, where the first BBP is configured to perform control plane protocol processing on a terminal served by the first BBP, and the second BBP is configured to share data transmission protocol processing for the terminal served by the first BBP.

In a first possible implementation manner of the second aspect, the first BBP is further configured to schedule the terminal served by the first BBP.

With reference to the first possible implementation manner of the second aspect, in a second possible implementation manner of the second aspect, the first BBP is connected to the second BBP by using an interface, the second BBP is configured to transfer a notification message to the first BBP through the interface, where the notification message is used to notify the first BBP that a data transmission queue is not null; the first BBP is configured to schedule the terminal according to the notification message, and transfer a scheduling result to the second BBP through the interface; and the second BBP is further configured to constitute a packet data unit according to the scheduling result; and transfer the constituted packet data unit to a physical layer of the second BBP, to send the packet data unit through the physical layer of the second BBP, or transfer the constituted packet data unit to the first BBP through the interface, to send the packet data unit through a physical layer of the first BBP.

With reference to the second aspect or either of the first and second possible implementation manners of the second aspect, in a third possible implementation manner of the second aspect, the baseband device further includes: a main control board, configured to detect loads of the multiple BBPs, and determine the first BBP and the second BBP according to the loads of the multiple BBPs; and further configured to trigger the first BBP to migrate all or part of data transmission protocol processing for the terminal served by the first BBP to the second BBP.

With reference to the second aspect or either of the first and second possible implementation manners of the second aspect, in a fourth possible implementation manner of the second aspect, each BBP is further configured to detect a load of the BBP; and each BBP is further configured to determine, according to the load of the BBP, whether the BBP can be used as the first BBP or the second BBP; and when the BBP can be used as the first BBP, the BBP is further configured to migrate all or part of data transmission protocol processing for the terminal served by the first BBP to the second BBP; or each BBP is further configured to share the detected load of the BBP with the other; and one BBP of the multiple BBPs is further configured to determine the first BBP and the second BBP according to the loads of the multiple BBPs, and is further configured to trigger the first BBP to migrate all or part of data transmission protocol processing for the terminal served by the first BBP to the second BBP.

With reference to the third or fourth possible implementation manner of the second aspect, in a fifth possible implementation manner of the second aspect, the load of the first BBP is greater than or equal to a first load threshold, and the load of the second BBP is less than or equal to a second load threshold, where the first load threshold is equal to or not equal to the second load threshold.

With reference to the fifth possible implementation manner of the second aspect, in a sixth possible implementation manner of the second aspect, the first load threshold and the second load threshold are preset or obtained through calculation by the multiple BBPs.

With reference to any one of the third to sixth possible implementation manners of the second aspect, in a seventh possible implementation manner of the second aspect, the first BBP is further configured to convert all or part of hardware resources of the migrated data transmission protocol processing into scheduling resources of the first BBP.

With reference to the second aspect or any one of the first to seventh possible implementation manners of the second aspect, in an eighth possible implementation manner of the second aspect, a same cell is deployed on the first BBP and the second BBP, and the first BBP and the second BBP undertake together data transmission protocol processing for all terminals in the same cell.

With reference to the eighth possible implementation manner of the second aspect, in a ninth possible implementation manner of the second aspect, the first BBP and the second BBP undertake together layer 2 protocol processing for all the terminals in the same cell.

With reference to the second aspect or any one of the first to ninth possible implementation manners of the second aspect, in a tenth possible implementation manner of the second aspect, the control plane protocol processing includes layer 3 protocol processing; and the second BBP is configured to share one or both of layer 2 and layer 1 protocol processing for the terminal served by the first BBP.

With reference to the tenth possible implementation manner of the second aspect, in an eleventh possible implementation manner of the second aspect, the data transmission protocol processing shared by the second BBP includes layer 2 protocol processing.

According to a third aspect, a baseband device is provided, including: at least two baseband processing boards (BBPs), where the at least two BBPs include a first BBP and a second BBP, where the first BBP is configured to: when a terminal accesses the baseband device, create and manage logical instances of the terminal that are at a layer 1 and a layer 2, and the second BBP is configured to: when the baseband device receives data of the terminal, perform one or both of layer 1 and layer 2 data transmission protocol processing on the data of the terminal, and reserve, on the first BBP, management on the logical instances of the terminal that are at the layer 1 and the layer 2; and a radio frequency interface, configured to send processed data of the terminal.

In a first possible implementation manner of the third aspect, the first BBP is further configured to schedule the terminal.

With reference to the first possible implementation manner of the third aspect, in a second possible implementation manner of the third aspect, the scheduling includes downlink scheduling, the first BBP is configured to schedule the terminal, and transfer a scheduling result to the second BBP;

the second BBP is configured to assemble the data of the terminal into a packet data unit according to the scheduling result; and the second BBP is configured to perform layer 1 processing on the assembled packet data unit; and transfer processed packet data unit to the first BBP for sending, or transfer the assembled packet data unit to the first BBP, so that the first BBP performs layer 1 processing on the assembled packet data unit and sends processed packet data unit.

With reference to the first or second possible implementation manner of the third aspect, in a third possible implementation manner of the third aspect, the scheduling includes uplink scheduling, the first BBP is configured to schedule the terminal, and transfer a scheduling result to the terminal;

the second BBP is configured to receive data that is sent by the terminal according to the scheduling result; and the second BBP is configured to perform one or both of layer 1 and layer 2 data transmission protocol processing on the data of the terminal.

With reference to the third aspect or any one of the first to third possible implementation manners of the third aspect, in a fourth possible implementation manner of the third aspect, the baseband device further includes:

a main control board, configured to detect loads of the at least two BBPs, and determine the first BBP and the second BBP according to the loads of the at least two BBPs; and further configured to trigger the first BBP to migrate all or part of data transmission protocol processing for the terminal to the second BBP.

With reference to the third aspect or any one of the first to third possible implementation manners of the third aspect, in a fifth possible implementation manner of the third aspect, each BBP is further configured to detect a load of the BBP; and each BBP is further configured to determine, according to the load of the BBP, whether the BBP can be used as the first BBP or the second BBP; and when the BBP can be used as the first BBP, the BBP is further configured to migrate all or part of data transmission protocol processing for the terminal served by the first BBP to the second BBP; or each BBP is further configured to share the detected load of the BBP with the other; and one BBP of the at least two BBPs is further configured to determine the first BBP and the second BBP according to the loads of the at least two BBPs, and is further configured to trigger the first BBP to migrate all or part of data transmission protocol processing for the terminal to the second BBP.

With reference to the fourth or fifth possible implementation manner of the third aspect, in a sixth possible implementation manner of the third aspect, the load of the first BBP is greater than or equal to a first load threshold, and the load of the second BBP is less than or equal to a second load threshold, where the first load threshold is equal to or not equal to the second load threshold.

With reference to the third aspect or any one of the first to sixth possible implementation manners of the third aspect, in a seventh possible implementation manner of the third aspect, the first BBP is further configured to convert all or part of hardware resources of the migrated data transmission protocol processing into scheduling resources of the first BBP.

With reference to the third aspect or any one of the first to seventh second possible implementation manners of the third aspect, in an eighth possible implementation manner of the third aspect, a same cell is deployed on the first BBP and the second BBP, and the first BBP and the second BBP undertake together data transmission protocol processing for all terminals in the same cell.

With reference to the eighth possible implementation manner of the third aspect, in a ninth possible implementation manner of the third aspect, the first BBP and the second BBP undertake together layer 2 protocol processing for all the terminals in the same cell.

According to a fourth aspect, a base station is provided, including: the baseband device according to the second aspect or any possible implementation manner of the second aspect, or the third aspect or any possible implementation manner of the third aspect; a radio frequency apparatus, connected to the baseband device, and configured to receive data from a terminal and transfer the data to the baseband device for processing, or send data processed by the baseband device to a terminal; and an interface circuit, configured to receive data from a core network and transfer the data to the baseband device for processing, or send data processed by the baseband device to a core network.

According to a fifth aspect, a method for enhancing a processing capability of a base station is provided, applied to a base station including at least two baseband processing boards (BBPs), where the at least two BBPs include a first BBP and a second BBP, and the method includes:

when a terminal accesses the base station, creating and managing, on the first BBP, logical instances of the terminal that are at a layer 1 and a layer 2;

when receiving data of the terminal, performing, on the second BBP, one or both of layer 1 and layer 2 data transmission protocol processing on the data of the terminal, and reserving, on the first BBP, management on the logical instances of the terminal that are at the layer 1 and the layer 2; and sending processed data of the terminal.

In a first possible implementation manner of the fifth aspect, in the process of performing, on the second BBP, one or both of layer 1 and layer 2 data transmission protocol processing on the data of the terminal, and managing, on the first BBP, the logical instances of the terminal that are at the layer 1 and the layer 2, the method further includes:

scheduling the terminal by using the first BBP.

With reference to the first possible implementation manner of the fifth aspect, in a second possible implementation manner of the fifth aspect, the scheduling includes downlink scheduling, and the scheduling the terminal by using the first BBP, and the performing, on the second BBP, one or both of layer 1 and layer 2 data transmission protocol processing on the data of the terminal include:

scheduling, by the first BBP, the terminal, and transferring a scheduling result to the second BBP;

assembling, by the second BBP, the data of the terminal into a packet data unit according to the scheduling result; and performing, by the second BBP, layer 1 processing on the assembled packet data unit; and transferring processed packet data unit to the first BBP for sending, or transferring the assembled packet data unit to the first BBP, so that the first BBP performs layer 1 processing on the assembled packet data unit and sends processed packet data unit.

With reference to the first or the second possible implementation manner of the fifth aspect, in a third possible implementation manner of the fifth aspect, the scheduling includes uplink scheduling, and the scheduling the terminal by using the first BBP, and the performing, on the second BBP, one or both of layer 1 and layer 2 data transmission protocol processing on the data of the terminal include:

scheduling, by the first BBP, the terminal, and transferring a scheduling result to the terminal;

receiving, by the second BBP, data that is sent by the terminal according to the scheduling result; and performing, by the second BBP, one or both of layer 1 and layer 2 data transmission protocol processing on the data of the terminal.

With reference to the fifth aspect or any one of the first to the third possible implementation manner of the fifth aspect, in a fourth possible implementation manner of the fifth aspect, before the performing, by the second BBP, one or both of layer 1 and layer 2 data transmission protocol processing on the data of the terminal, and managing, on the first BBP, the logical instances of the terminal that are at the layer 1 and the layer 2, layer 1 data transmission protocol processing and layer 2 data transmission protocol processing are performed, on the first BBP, on data of the terminal; and when it is detected that a load of the first BBP is greater than or equal to a first load threshold, one or both of layer 1 and layer 2 data transmission protocol processing is performed, on the second BBP, on data of the terminal, where a load of the second BBP is less than or equal to a second load threshold.

With reference to the fourth possible implementation manner of the fifth aspect, in a fifth possible implementation manner of the fifth aspect, the method further includes:

converting, into scheduling resources of the first BBP, all or part of hardware resources that are used by the first BBP to perform layer 1 and layer 2 data transmission protocol processing on data of the terminal.

With reference to the fifth aspect or any one of the first to fifth possible implementation manners of the fifth aspect, in a sixth possible implementation manner of the fifth aspect, a same cell is deployed on the first BBP and the second BBP, the terminal is in the same cell, and the first BBP and the second BBP undertake together one or both of layer 1 and layer 2 data transmission protocol processing for all terminals in the same cell.

With reference to the sixth possible implementation manner of the fifth aspect, in a seventh possible implementation manner of the fifth aspect, the first BBP and the second BBP undertake together layer 2 data transmission protocol processing for all the terminals in the same cell.

According to a sixth aspect, a communications system is provided, including: a base station and a core network device, where the base station includes the baseband device according to the second aspect or any possible implementation manner of the second aspect, or the third aspect or any possible implementation manner of the third aspect, and the base station is configured to receive data of a terminal from the terminal and send the data, which is processed by the baseband device, of the terminal to the core network, or receive data of a terminal from the core network and send the data, which is processed by the baseband device, of the terminal to the terminal.

It can be seen that, according to the foregoing method, device, or system, a BBP assistance mechanism is put forward to enhance a processing capability of a BBP, to further enhance an overall processing capability of a base station on the whole. In the BBP assistance mechanism, a BBP having a redundant processing capability is used to assist another BBP in performing service processing, so that an inter-board load is balanced, and the processing capability of the BBP is enhanced on the whole.

Further, according to the foregoing method, device, or system, a hardware resource occupied by a scheduler can be dynamically expanded, so that a freed up hardware processing capability is reallocated to the scheduler, to enhance a scheduling capability of a primary board.

Further, according to the foregoing method, device, or system, terminal scheduling and data transmission protocol processing may be separated, and are deployed on different BBPs, to reduce a requirement on an inter-board capability; moreover, the BBPs do not affect a scheduling capability of each other.

BRIEF DESCRIPTION OF DRAWINGS

To describe the technical solutions in embodiments of the present invention more clearly, the following briefly describes the accompanying drawings for describing the embodiments. The accompanying drawings in the following description show some embodiments of the present invention, and a person of ordinary skill in the art may still derive other drawings from these accompanying drawings without creative efforts.

DESCRIPTION OF EMBODIMENTS

Figure 1:
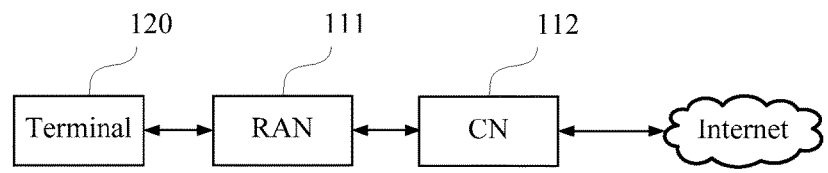
FIG. 1 is a schematic structural diagram of an existing mobile communications system.

To make objectives, technical solutions, and advantages of the present invention clearer, the following describes technical solutions in embodiments of the present invention with reference to the accompanying drawings. The described embodiments are some but not all of the embodiments of the present invention. All other embodiments obtained by a person of ordinary skill in the art based on the described embodiments of the present invention without creative efforts shall fall within the protection scope of the present invention.

Some terms in this application are explained and described below for the convenience of understanding by a person skilled in the art.

1. A base station, also referred to as a RAN device, is a device connecting a terminal to a wireless network, and includes, but is not limited to: an evolved node B (eNB), a radio network controller (RNC), a node B (NB), a base station controller (BSC), a base transceiver station (BTS), a home base station (for example, a Home evolved NodeB, or a Home Node B, HNB), a baseband unit (BBU), a WiFi access point (AP), and the like.

2. A terminal, also referred to as user equipment (UE), is a device providing voice and/or data connectivity to a user, such as a handheld device having a wireless connection function, an in-vehicle device, or another processing device connected to a wireless modem.

3. "Multiple" refers to two or more than two. "And/or" describes an association relationship between associated objects and represents that three relationships may exist. For example, A and/or B may represent the following three cases: Only A exists, both A and B exist, and only B exists. The character "/" generally indicates an "or" relationship between the associated objects.

Currently, a deployment policy of a BBP is static deployment, that is, when a cell is configured on a BBP, service processing, including terminal scheduling and data transmission, of all terminals in the cell are deployed on the BBP. Use of this type of static deployment policy causes the following problems:

First, a BBP bearing a hotspot cell has an inadequate hardware processing capability, causing a high load ratio of a processor (for example, a central processing unit, CPU). The excessively large load of the processor easily triggers system traffic control, and even causes an exception of the BBP in an extreme scenario.

Second, the triggering of the system traffic control causes a reduction in a scheduling capability and a data throughput rate of a terminal. In this scenario, because a hardware processing capability of the board is inadequate, a system cannot fully use air interface resources, causing a waste of air interface resources.

Third, for a BBP bearing a non-hotspot cell, because a quantity of terminals on the board is not large, the board has a small load. In this scenario, a hardware capability of the BBP cannot be fully used.

In this application, the foregoing problems are analyzed, and a BBP assistance mechanism is put forward to enhance a processing capability of a BBP, to further enhance a processing capability of a base station on the whole. In the BBP assistance mechanism, a redundant processing capability of a BBP having a small load is used to assist a BBP having a large load in performing service processing, so that an inter-board load is balanced, and the processing capability of the BBP is enhanced on the whole.

The foregoing mechanism may be considered as an inter-board resource sharing mechanism, that is, resources of BBPs assisting each other may be shared, and a resource pool is formed. This application further provides an intra-board resource sharing mechanism. In resources of each BBP, some resources are used to schedule a terminal, and the resources are referred to as scheduling resources below; some resources are used to transmit data of a terminal, and the resources are referred to as data transmission resources below. In the intra-board resource sharing mechanism, a scheduling resource may be expanded, to occupy an unoccupied data transmission resource, so that a scheduling capability and a data throughput rate of a terminal on a board are further enhanced.

The foregoing two mechanisms are combined, so that a scheduling capability of a BBP is enhanced, a data throughput is increased, and an inter-board load is balanced by using the intra-board resource sharing technology and the inter-board resource sharing technology, and a current problem that performance is limited by a capability of a board and a service load is unbalanced is improved.

It should be noted that a resource herein refers to a hardware resource, that is, calculation, storage, and transmission capabilities, and the like provided by hardware (for example, a BBP) of a base station.

Figure 2:
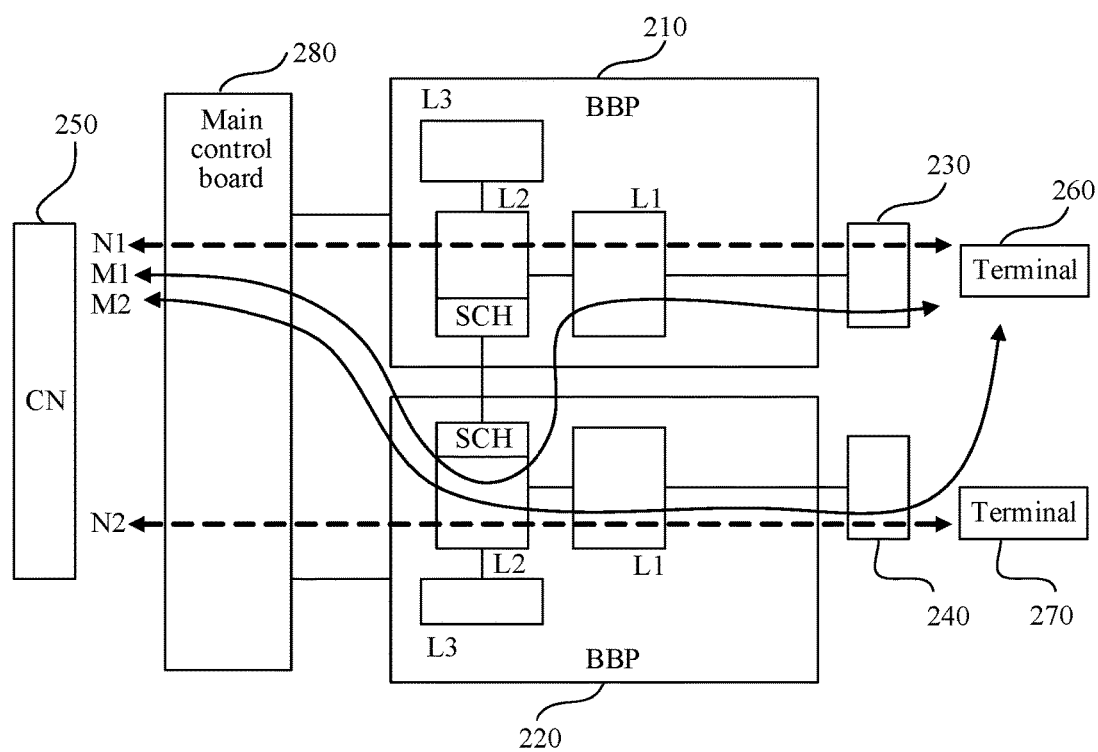
FIG. 2 is a schematic structural diagram of a base station according to an embodiment of the present invention.

Refer to FIG. 2, which is a schematic structural diagram of a base station according to an embodiment of the present invention. As shown in FIG. 2, the base station includes multiple BBPs. For convenience of description, two BBPs, a BBP 210 and a BBP 220, are used as an example herein. A scenario of more BBPs is similar to a scenario of two BBPs. These BBPs may be connected to a main control board 280, to exchange data with a core network (CN) 250 through the main control board 280. In addition, these BBPs are connected to a radio frequency apparatus, to exchange data with a terminal through the radio frequency apparatus. For example, the BBP 210 and the BBP 220 are respectively connected to a radio frequency apparatus 230 and a radio frequency apparatus 240.

The main control board 280 is mainly configured to provide a control plane resource, and process control signaling. A BBP is mainly configured to provide a baseband resource and a control plane resource, where the baseband resource is mainly used to undertake data transmission protocol processing, which, for example, includes layer 2 (L2) and layer 1 (L1) protocol processing; the control plane resource is mainly used to undertake control plane protocol processing, for example, layer 3 (L3) protocol processing.

In the prior art, in a downlink direction, the main control board 280 receives data of a terminal 260 and a terminal 270 from the core network 250, where a serving cell of the terminal 260 is deployed on the BBP 210, and a serving cell of the terminal 270 is deployed on the BBP 220. The main control board 280 respectively transfers the data of the terminal 260 and the data of the terminal 270 to the BBP 210 and the BBP 220. The BBP 210 and the BBP 220 respectively performs data transmission protocol processing, for example, L2 and L1 processing, on the received data, and respectively sends processed data to the terminal 260 and the terminal 270 through the radio frequency apparatus 230 and the radio frequency apparatus 240. In an uplink direction, the BBP 210 and the BBP 220 respectively receives the data of the terminal 260 and the terminal 270 through the radio frequency apparatus 230 and the radio frequency apparatus 240. Then, the BBP 210 and the BBP 220 respectively perform data transmission protocol processing on the received data, for example, L2 and L1 processing, and send processed data to the core network 250 through the main control board 280. A data transmission direction is shown by dashed lines N1 and N2 in FIG. 2.

When the BBP 210 undertakes a service of a hotspot cell, a case in which a hardware processing capability is inadequate often occurs. Therefore, this embodiment of the present invention provides a BBP assistance mechanism to resolve this problem. As shown by a solid line M1 or M2 in FIG. 2, all or part of data transmission protocol processing performed by the BBP 210 for the terminal 260 is migrated to the BBP 220. As shown by the solid line M1, only L2 data transmission protocol processing is migrated to the BBP 220; then, as shown by the solid line M2, both L1 and L2 data transmission protocol processing are migrated to the BBP 220.

It should be noted that although migration of data transmission protocol processing for only the terminal 260 is described herein, this application is not limited thereto. Data transmission protocol processing for all terminals served by the BBP 210 may be migrated as that of the terminal 260. In addition, alternatively, data transmission protocol processing for some of terminals served by the BBP 210 may be migrated. Moreover, the data transmission protocol processing may be migrated to another one BBP, or may be migrated to another multiple BBPs, which is not limited in this application.

Figure 3:
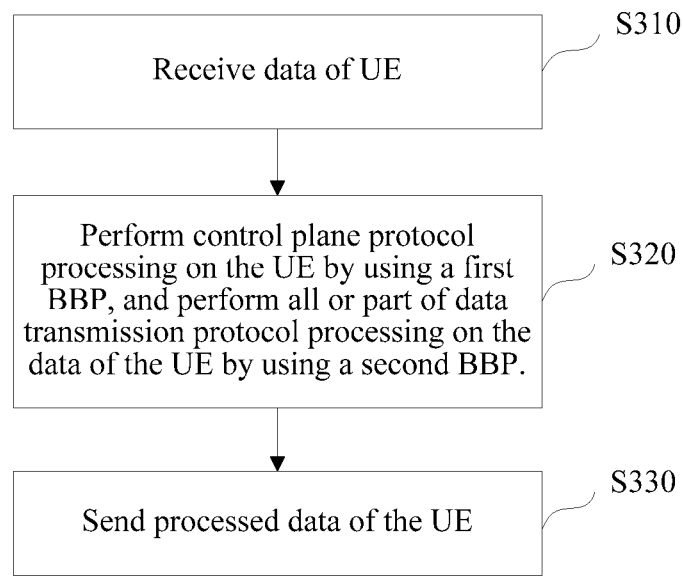
FIG. 3 is a flowchart of a method for enhancing a processing capability of a base station according to an embodiment of the present invention.

It can be seen that an embodiment of the present invention provides a method for enhancing a processing capability of a base station. The method is executed by a base station, and the base station includes multiple BBPs. As shown in FIG. 3, the method includes the following steps:

S310: Receive data of a terminal.

S320: Perform control plane protocol processing on the terminal by using a first BBP, and perform all or part of data transmission protocol processing on the data of the terminal by using a second BBP.

S330: Send processed data of the terminal.

The control plane protocol processing on the terminal mainly refers to L3 protocol processing on the terminal, for example, Radio Resource Control (RRC) protocol processing. The data transmission protocol processing for the terminal mainly refers to L2 and L1 protocol processing. For example, L1 protocol processing mainly includes a physical layer (PHY) protocol processing, and L2 protocol processing mainly includes Packet Data Convergence Protocol (PDCP) processing, Radio Link Control (RLC) protocol processing, Media Access Control (MAC) protocol processing, and the like. Performing all or part of data transmission protocol processing on the data of the terminal by using the second BBP may be: performing L2 protocol processing or L1 protocol processing on the data of the terminal by using the second BBP, or may be performing L1 protocol processing and L2 protocol processing on the data of the terminal by using the second BBP.

Continuing to refer to FIG. 2, scheduling (SCH) on the terminal may be reserved on the BBP 210, or may be migrated to the BBP 220. Preferably, even though data transmission protocol processing (including L2 data transmission protocol processing) for the terminal 260 is migrated, scheduling on the terminal 260 is still reserved on the BBP 210. In this way, use of a scheduling resource of another BBP may not be affected. In addition, compared with a scheduling migration scenario, an amount of data exchanged between boards is relatively small, a requirement on an inter-board capability is relatively low, and hardware costs are low.

Figure 4:
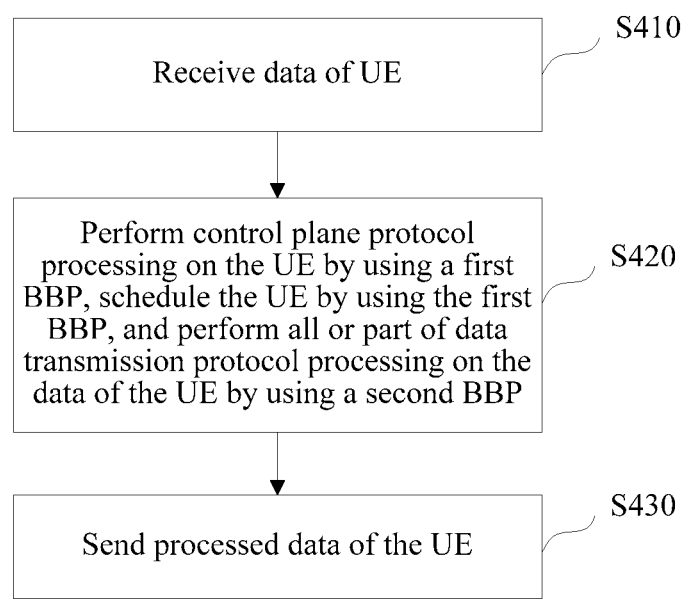
FIG. 4 is a flowchart of another method for enhancing a processing capability of a base station according to an embodiment of the present invention.

Continuing to refer to FIG. 3, preferably, the foregoing step S320 further includes: scheduling the terminal by using the first BBP. In this case, as shown in FIG. 4, another method for enhancing a processing capability of a base station provided in an embodiment of the present invention includes the following steps:

S410: A base station receives data of a terminal.

S420: Perform control plane protocol processing on the terminal by using a first BBP, schedule the terminal by using the first BBP, and perform all or part of data transmission protocol processing on the data of the terminal by using a second BBP.

S430: Send processed data of the terminal.

Figure 5:
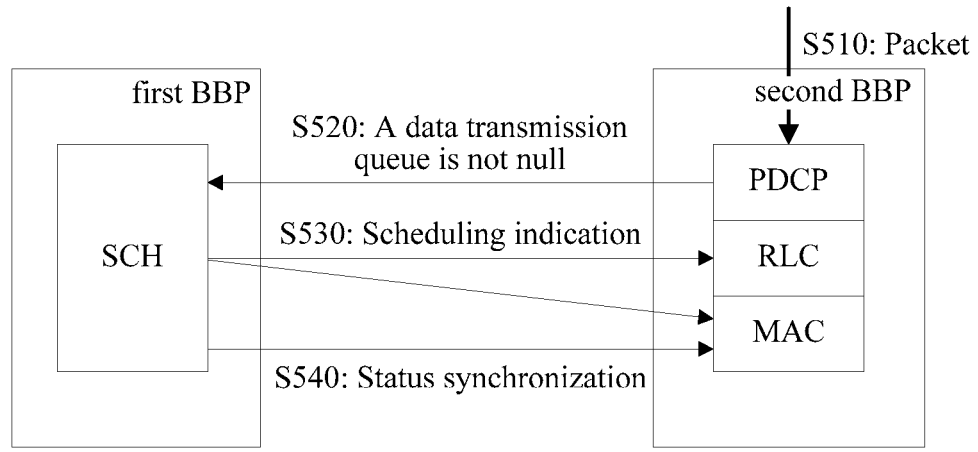
FIG. 5 is a schematic diagram of L2 scheduling and transmission protocol processing according to an embodiment of the present invention.

When L2 transmission protocol processing for the terminal is migrated to the second BBP, and the scheduling is reserved on the first BBP, the second BBP constitutes a packet according to indication information transmitted by the first BBP. For example, refer to FIG. 5, which is a schematic diagram of L2 scheduling and transmission protocol processing according to an embodiment of the present invention. As shown in FIG. 5, the L2 scheduling and transmission protocol processing includes the following steps:

S510: A PDCP layer of a second BBP receives a packet of a terminal, where the terminal is scheduled on a first BBP.

S520: The second BBP transfers a notification message to the first BBP, where the notification message is used to notify a scheduler of the first BBP that a data transmission queue is not null, and the data transmission queue may also be referred to as a buffer queue, or a PDCP-RLC queue.

S530: When learning that the data transmission queue is not null, the first BBP schedules the terminal, and transfers a scheduling indication (or a packet constitution indication) to the second BBP, where the scheduling indication is used to notify an RLC layer and a MAC layer of a scheduling result, for example, a size of a constituted packet carried by the terminal, and which terminals are scheduled in a current transmission time interval (TTI), so that the RLC layer of the second BBP assembles a service data unit (SDU) into an RLC packet data unit (PDU) on a bearer of the terminal according to the scheduling indication, and transfers the RLC packet data unit to the MAC. The MAC assembles the RLC PDU into a MAC PDU, that is, a transport block (TB), according to the scheduling indication, and transfers the MAC PDU to a PHY layer for transmission.

When L1 data transmission is also migrated to the second BBP, the second BBP transmits the transport block through a PHY layer of the second BBP; when L1 data transmission is reserved on the first BBP, the second BBP transfers the transport block to the first BBP, to transmit the transport block through a PHY layer of the first BBP.

S540: After the RLC layer completes packet assembly of each scheduled terminal or data updating on a data transmission queue, the second BBP transfers a status synchronization message to the scheduler of the first BBP, to implement status synchronization.

It should be noted that FIG. 2 only gives an example of a base station structure. The BBP assistance mechanism (or the inter-board resource sharing mechanism) described in the foregoing embodiments is further applicable to another base station structure. For example, a main control board 280 is not disposed in a base station, and each BBP has an independent interface or control unit, which is configured to exchange data with a core network. Alternatively, BBPs of a base station may be connected to each other in any form, to establish a connection to the core network through one BBP or some BBPs. The base station structure is not limited in this application. As long as a base station includes multiple BBPs, regardless of how the BBPs are connected, a processing capability of the base station can be enhanced by using the foregoing BBP assistance mechanism (or the inter-board resource sharing mechanism).

In the foregoing embodiments, the second BBP shares data transmission protocol processing on the first BBP, so that a processing capability of the first BBP is enhanced. It should be noted that there may be one or more second BBPs. The second BBP may be changed dynamically, or may be fixed. For example, a BBP may be dynamically selected as a second BBP according to a load status of each BBP of the base station, to share data transmission protocol processing on the first BBP. Alternatively, one BBP or some BBPs may be fixed to share data transmission protocol processing on the first BBP. In addition, the first BBP may be changed dynamically, or may be fixed. For example, a load status of each BBP of a base station may be monitored in real time, and when a load of a BBP reaches or exceeds a threshold, another BBP is needed to share the load of the BBP. Therefore, the BBP is used as a first BBP. For another example, a BBP bears a hotspot cell, and each time the cell is in a service peak period, the BBP is used as a first BBP, so that all or part of data transmission protocol processing on the first BBP is migrated to another BBP. In addition, the foregoing threshold may also be a preset threshold, or may be a dynamically changeable threshold, for example, the threshold may be an average load of BBPs of the base station.

An example in which the first BBP and the second BBP may be dynamically selected is used below for description. A person skilled in the art may obtain an embodiment in which one or both of the first BBP and the second BBP are fixed.

Figure 6:
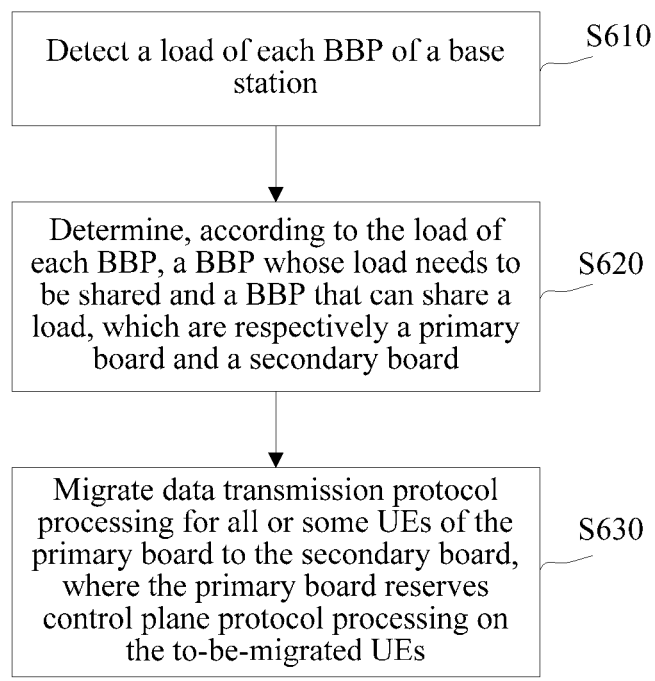
FIG. 6 is a flowchart of still another method for enhancing a processing capability of a base station according to an embodiment of the present invention.

Refer to FIG. 6, which is a flowchart of still another method for enhancing a processing capability of a base station according to an embodiment of the present invention. As shown in FIG. 6, the method includes the following steps:

S610: Detect a load of each BBP of a base station.

In a running process, the base station may dynamically detect the load of each BBP. The dynamic detection herein may be real-time detection, or may be periodic detection. In addition, the base station may trigger detection on the load of each BBP within a fixed time period or according to an event. For example, the base station bears a hotspot cell, the hotspot cell is in a service peak period within a fixed time period, and detection on the load of each BBP may be started only within this time period. In addition, when a celebration is held, a base station covering a place of the celebration activity may start detection on the load of each BBP of the base station.

The load herein may be represented in multiple forms, for example, may be represented by using a usage of a processor (for example, a CPU) of a BBP, or may be represented by using a quantity of terminals accessing the BBP, service traffic, or the like. Using a usage of a processor as an example, the base station may learn a load status of each BBP by detecting a usage of a processor of each BBP.

It should be noted that, when a main control board is disposed in the base station, step S610 may be preferably performed by the main control board. Certainly, alternatively, a detection unit may be disposed on each BBP, and step S610 is performed by the detection unit of each BBP. In addition, one or some BBPs may be specified to perform step S610, which is not limited in this application.

S620: Determine, according to the load of each BBP, a BBP whose load needs to be shared and a BBP that can share a load, which are respectively referred to as a primary board and a secondary board.

For example, the base station may calculate an average load of the whole base station according to the load of each BBP, to determine a BBP whose load is greater than the average load as the primary board, and to determine a BBP whose load is less than the average load as the secondary board, so that all or part of data transmission protocol processing on the primary board is migrated to the secondary board. It should be noted that a BBP whose load is equal to the average load may be or may not be used as the primary board, that is, data transmission protocol processing on the BBP may be or may not be migrated.

The foregoing average load is a dynamically changeable load threshold. Optionally, a fixed load threshold may be preset according to a processing capability of a BBP. The base station may compare a detected load of a BBP with the load threshold, use a BBP whose load is greater than or equal to the load threshold as the primary board, and use a BBP whose load is less than the load threshold as the secondary board.

In addition, different load thresholds, for example, a primary board threshold and a secondary board threshold, may be set for the primary board and the secondary board, where the secondary board threshold is less than the primary board threshold. When a load of a BBP is greater than or equal to the primary board threshold, the BBP is used as the primary board. When a load of a BBP is less than or equal to the secondary board threshold, the BBP is used as the secondary board. Using a usage of a processor as an example, a usage being 70% of a processor is used as a primary board threshold, and a usage being 60% of a processor is used as a secondary board threshold. When a usage of a processor of a BBP reaches 70% or more, data transmission protocol processing for some terminals on the BBP may be migrated to a BBP whose processor has a usage less than or equal to 60%.

In addition, two load thresholds may be set for the primary board, and are respectively an enabling threshold and a disabling threshold. When a load of the primary board reaches or exceeds the enabling threshold, load sharing is enabled. When the load of the primary board is less than or equal to the disabling threshold, load sharing is disabled. Similarly, using a usage of a processor as an example, a usage being 70% of a processor is used as an enabling threshold, and a usage being 30% of a processor is used as a disabling threshold. When a usage of a processor of a BBP reaches 70% or more, data transmission protocol processing for some terminals on the BBP may be migrated to another BBP. When the usage of the processor of the BBP does not reach 30%, load migration processing may not be performed on the BBP.

Moreover, when an amount of loads needing to be migrated is determined, the disabling threshold may be used as a reference, and only some loads exceeding the disabling threshold are migrated to another BBP.

The base station may further determine, according to a load of the primary board, an amount of loads needing to be migrated, and determine, according to a load of the secondary board, an amount of loads that can be shared by each secondary board. Preferably, a terminal may be used as a granularity for load migration, a quantity of terminals needing to be migrated to the secondary board may be determined according to an amount of loads needing to be migrated from the primary board, and a quantity of terminals that can be shared by each secondary board is determined according to an amount of loads that can be shared by each secondary board. Certainly, a cell may be further used as a granularity, which is not limited in this application.

When there is more than one primary board whose load needs to be shared, which secondary board or secondary boards shares or share loads of the primary boards may be determined according to a descending order of loads. Certainly, this order may also not be used, and is not limited in this application.

When there is more than one secondary board that can share a load, the load of the primary board may be preferentially migrated to a secondary board having a smallest load according to an ascending order of loads. Certainly, another manner may also be used.

Preferably, it is preferentially considered that a load of one primary board is migrated to as few secondary boards as possible, which can reduce demands of inter-board information transmission. As mentioned above, a terminal is used as a granularity for load migration, a quantity of terminals needing to be migrated to the secondary board may be determined according to an amount of loads needing to be migrated from the primary board, and a quantity of terminals that can be shared by each secondary board is determined according to an amount of loads that can be shared by each secondary board. Therefore, when one secondary board can completely share terminals needing to be migrated from the primary board, all the terminals needing to be migrated from the primary board may be migrated to the secondary board, and are not migrated to another secondary board, unless there is no secondary board that can completely share the terminals needing to be migrated from the primary board.

It should be noted that both load migration and terminal migration refer to migration of data transmission protocol processing.

In addition, when a main control board is disposed in the base station, step S620 and the foregoing step S610 may be preferably performed by the main control board. When the foregoing step S610 is performed by a detection unit of each BBP, a detected load of each BBP may be aggregated to the main control board or one BBP, and the main control board or the BBP performs step S620.

S630: Migrate data transmission protocol processing for all or some terminals (which are referred to as to-be-migrated terminals below) of the primary board to the secondary board, where the primary board reserves control plane protocol processing on the to-be-migrated terminals.

For example, the primary board may migrate data transmission protocol processing for the to-be-migrated terminal to the secondary board by using a handover process. A difference between the handover process and an existing handover process is: a terminal located in a same cell before and after a handover, and only a configured location for a data transmission protocol of the cell changes. For example, the terminal is notified of locations of L1 processing and L2 processing by means of a handover (HO) command, that is, which BBPs the L1 processing and L2 processing are located on. Herein, to distinguish with existing handover, the handover is referred to as intra-cell handover. An objective of initiating intra-cell handover is to instruct, by means of a simple process, the terminal to access the cell again, so as to reconfigure locations or a location of L1 protocol processing and/or L2 protocol processing on data of the terminal. Therefore, any existing signaling that may trigger the terminal to access the cell again may be used to implement this function. In addition, a piece of new signaling may be added to implement the function, which is not limited in this application.

Preferably, in the foregoing step S630, the primary board may further reserve scheduling on the to-be-migrated terminal, to reduce impact on a scheduling resource of another BBP. Compared with a scheduling migration scenario, an amount of data exchanged between boards is relatively small, a requirement on an inter-board capability is relatively low, and hardware costs are low.

It can be seen that, in the foregoing method, when a base station detects that a BBP (a primary board) has an excessively large load, and the load needs to be shared, the base station migrates data transmission protocol processing of all or some terminals on the BBP to another BBP (a secondary board) having a relatively small load, so that a data transmission processing load of the primary board is reduced, and a data transmission processing capability of the primary board is enhanced.

Preferably, a scheduling resource of the primary board may be further expanded, to enhance a scheduling capability of the primary board. For example, a quantity of data transmission threads on the primary board may be reduced and a quantity of scheduling threads may be increased in a manner of redeploying data transmission threads and scheduling threads.

Figure 7:
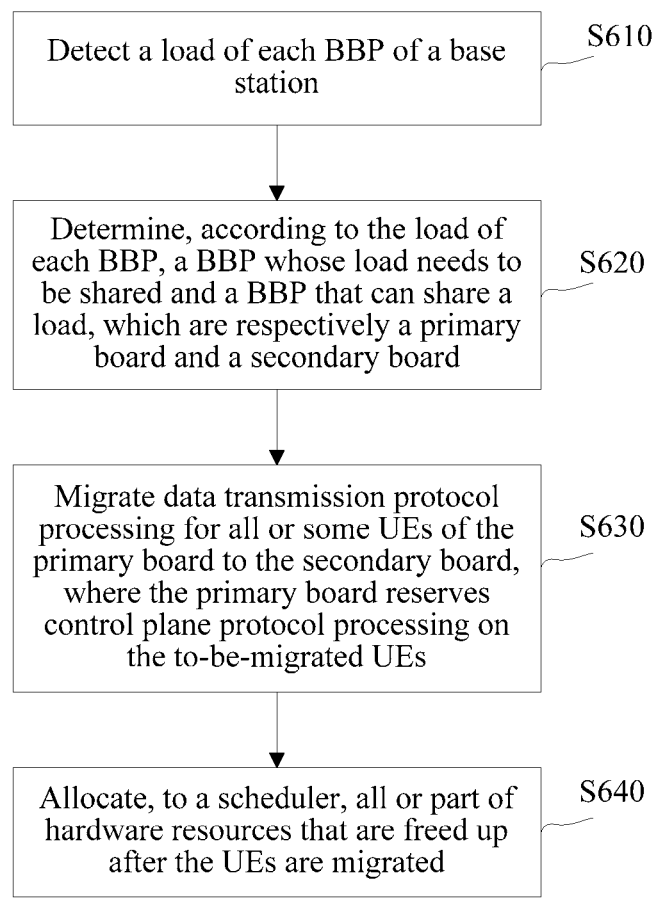
FIG. 7 is a flowchart of still another method for enhancing a processing capability of a base station according to an embodiment of the present invention.

In this case, as shown in FIG. 7, the foregoing method may further include the following steps:

S640: After migrating data transmission protocol processing for all or some terminals on the primary board to the secondary board, allocate, to a scheduler, all or part of hardware resources that are freed up after the terminals are migrated, and convert all or part of freed-up data transmission resources into scheduling resources, to enhance a scheduling capability of the primary board.

The hardware resource is, for example, a processor core or a thread, and expansion of the scheduling resources may be intra-core (or intra-thread) resource expansion, or may be inter-core (or inter-thread) resource expansion.

For example, in a processor core (or thread), because of migration of data transmission protocol processing and a reduction in a data transmission protocol load, the scheduler may preempt more time slice resources in the core (or thread), to enhance a scheduling capability. That is, all or part of time slice resources that are freed up after migration of data transmission protocol processing may be reallocated to the scheduler and are used as scheduling resources.

For another example, in multiple cores (or threads) of a processor, at least one core (or thread) that is freed up after migration of data transmission protocol processing may be reallocated to the scheduler and is used as a scheduling resource, to enhance a scheduling capability.

Figure 8:
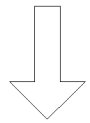
FIG. 8 is a schematic diagram of expansion of a scheduling resource according to an embodiment of the present invention.

FIG. 8 describes an example of inter-core (or inter-thread) resource expansion. As shown in FIG. 8, currently, a scheduler of a BBP usually occupies three cores (or threads). As shown by using SCH in the figure, three-cell scheduling is performed. After a primary board migrates some data transmission services to a secondary board, assuming that three cores (or threads) are freed up on the primary board and are allocated to the scheduler, as shown by using a slash part in the figure, the scheduler may be dynamically handed over to occupy six cores (or threads). Optionally, uplink scheduling (ULSCH) and downlink scheduling (DLSCH) that are originally deployed on one thread may be deployed on two threads, so that the scheduler occupies more hardware resources, to achieve an objective of scheduling enhancement.

Figure 9:
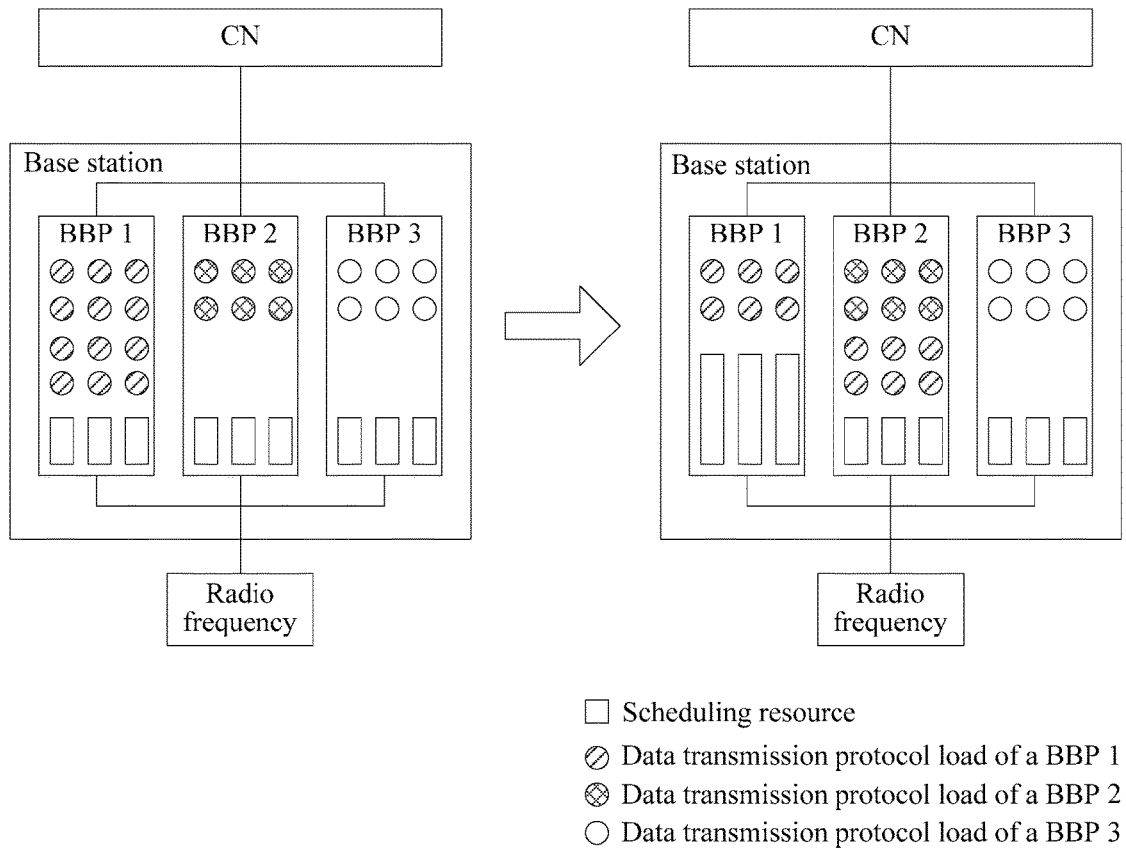
FIG. 9 is a schematic diagram of a scheduling resource after migration of data transmission protocol load according to an embodiment of the present invention.

Continuing to refer to FIG. 9, a data transmission protocol load of a BBP 1 in the figure is migrated to a BBP 2, or certainly, may be migrated to a BBP 3, or a BBP 2 and a BBP 3. After the data transmission protocol load is migrated, expansion of a scheduling resource occupies a hardware resource occupied by the transferred data transmission protocol load, and the hardware resource is converted into a scheduling resource, so that a scheduling capability of the BBP 1 is enhanced.

Further, for a terminal that initially accesses the primary board or a terminal that is handed over to the primary board, data transmission protocol processing for the terminal may be deployed on the secondary board, and control plane protocol processing and scheduling on the terminal are reserved on the primary board. It should be noted that if the secondary board configured to share a load of the primary board, that is, the secondary board to which data transmission protocol processing is previously migrated, still has sufficient resources to process data of the terminal that initially accesses the primary board or is handed over to the primary board, data transmission protocol processing for the terminal may be deployed on the secondary board. Otherwise, the data transmission protocol processing may be deployed on another secondary board having an idle resource. In addition, if the primary board already reaches a critical point of load sharing, but sharing still does not need to be performed, for the terminal that initially accesses the primary board or is handed over to the primary board, data transmission protocol processing for the terminal may be deployed on the secondary board, and control plane protocol processing and scheduling on the terminal may be reserved on the primary board.

In the foregoing embodiment, the primary board and the secondary board may be dynamically selected. Certainly, alternatively, a BBP may be preset as the primary board, and a BBP or some BBPs is or are set as a secondary board or secondary boards of the primary board. In addition, only a primary board may be set, and a secondary board is dynamically selected by means of a load; or only a secondary board is set, and a primary board is dynamically determined by means of a load. The load using manner is similar to that in the foregoing embodiment, and is not described herein again.

Figure 10:
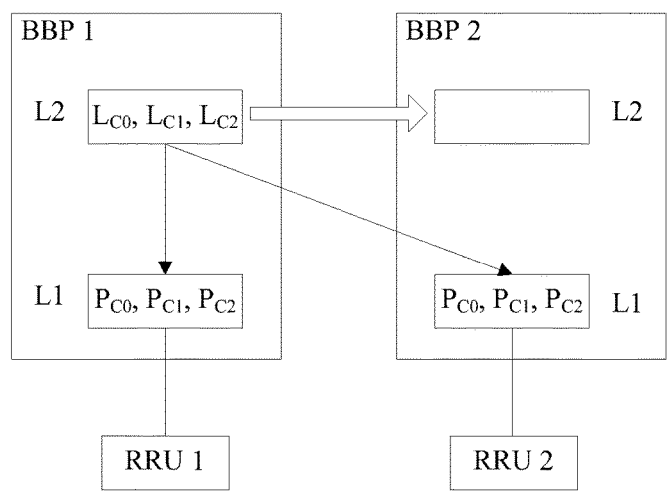
FIG. 10 is a schematic diagram of a scenario in which a processing capability of a base station is enhanced according to an embodiment of the present invention.

For a scenario in which a primary board and a secondary board of the primary board are set, if it may be determined that the secondary board always has an idle resource, all or part of data transmission protocol processing of the primary board may be directly deployed on the secondary board. A multi-RRU (Radio Remote Unit) cell is used as an example. As shown in FIG. 10, an RRU 1 and an RRU 2 are in one cell, and are respectively connected to a BBP 1 and a BBP 2. Physical cells $P_{C0}$, $P_{C1}$, and $P_{C2}$ are deployed on the BBP 1 and the BBP 2, and corresponding logical cells $L_{C0}$, $L_{C1}$, and $L_{C2}$ are deployed on the BBP 1. In this way, when a terminal is located in coverage of the RRU 1, L1 processing for the terminal is located on the BBP 1. When the terminal moves to coverage of the RRU 2, L1 processing for the terminal is located on the BBP 2. Because no logical cell is deployed on the BBP 2, an L2 resource of the BBP 2 is always idle. Therefore, all or part of L2 processing for a terminal that accesses the BBP 1, that is, a terminal that accesses the logical cells $L_{C0}$, $L_{C1}$, and $L_{C2}$, may be deployed on the BBP 2 from the start. For example, a terminal may be used as a granularity, some of terminals accessing the logical cells $L_{C0}$, $L_{C1}$, and $L_{C2}$ are deployed on the BBP 2. Specifically, a quantity of terminals deployed on the BBP 2 is not limited in this application, and may be, for example, ½ and ⅓ of terminals accessing the logical cells.

In addition, alternatively, when the BBP 1 has a relatively large load, for example, the load reaches or exceeds a load threshold, some of the terminals accessing the logical cells $L_{C0}$, $L_{C1}$, and $L_{C2}$ may be migrated to the BBP 2.

Descriptions about migration and a load are similar to those in the foregoing embodiment, and details are not described herein again.

It can be seen that, the foregoing embodiment provides a BBP assistance mechanism, and a secondary board shares a data transmission protocol processing load of a primary board, so that the data transmission protocol processing load of the primary board is reduced, and a processing capability of the primary board is enhanced. Data transmission resources on the primary board are reduced and scheduling resources are increased in a manner of redeploying a data transmission resource and a scheduling resource, so that a scheduling capability of the primary board is enhanced.

When a cell is configured on a BBP, and a terminal in the cell accesses the cell, a logical instance of the terminal is created on the BBP, and subsequent management on the logical instance of the terminal is performed on the BBP. When data transmission protocol processing of the terminal is migrated, management on the logical instance of the terminal is not migrated. In this way, an inter-board resource needed in migration of the logical instance may be avoided, baseband implementation complexity is reduced, and inter-board resource sharing is implemented by using relatively low costs.

For example, when a terminal whose serving cell is deployed on a first BBP accesses a base station, the first BBP creates a logical instance of the terminal, and management on the logical instance of the terminal is also executed by the first BBP; when all or part of data transmission protocol processing is migrated to a second BBP, management on the logical instance of the terminal is not migrated.

The logical instance is used to simulate, in a device (for example, a device that includes a hardware platform for operating a program instruction), a specific or prototypical object that exists in reality. That is, the logical instance herein is created in the base station to stimulate a physical terminal in reality, and an existence form of the logical instance may be a logical form, such as a database, code, and data. The base station creates a corresponding logical instance for each terminal accessing the base station, the logical instance corresponds to the physical terminal, operations that need to be performed by each base station on the physical terminal may all act on a logical instance of the physical terminal, and the instance may dynamically store an operation result.

Figure 11:
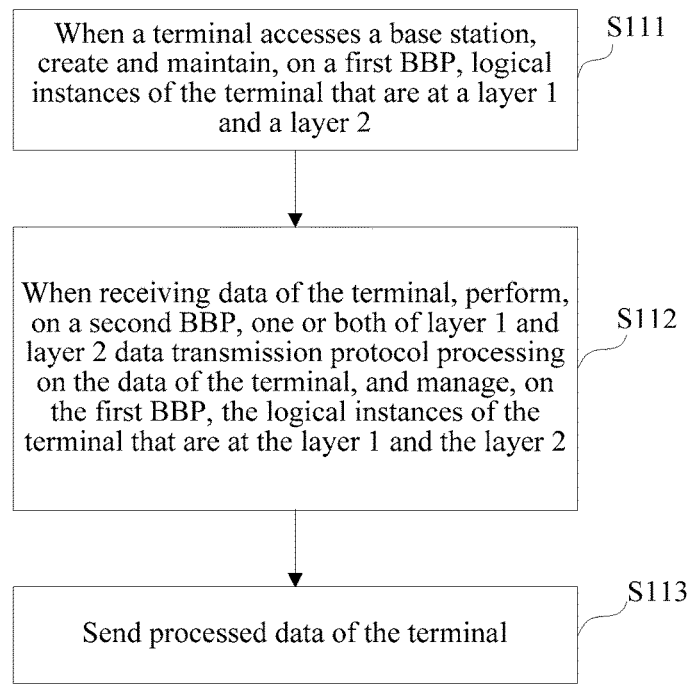
FIG. 11 is a flowchart of still another method for enhancing a processing capability of a base station according to an embodiment of the present invention.

Continue to refer to FIG. 11, which shows another method for enhancing a processing capability of a base station according to an embodiment of the present invention. The method is executed by a base station, the base station includes multiple BBPs, and the multiple BBPs include a first BBP and a second BBP. As shown in FIG. 11, the method includes the following steps:

S111: When a terminal accesses a base station, create and manage, on a first BBP, logical instances of the terminal that are at a layer 1 and a layer 2, where the first BBP is a BBP on which a serving cell of the terminal is located, that is, the serving cell of the terminal is deployed on the first BBP.

S112: When receiving data of the terminal, perform, on a second BBP, one or both of layer 1 and layer 2 data transmission protocol processing on the data of the terminal, and reserve, on the first BBP, management on the logical instances of the terminal that are at the layer 1 and the layer 2, that is, manage, on the first BBP, the logical instances of the terminal that are at the layer 1 and the layer 2.

S113: Send processed data of the terminal.

It can be seen that, after the foregoing processing, management on the logical instances of the terminal may be reserved on an original BBP, and all or part of data transmission protocol processing of the terminal is migrated to another BBP, so that data transmission resources needed by the original BBP are reduced, resolving a problem that a hardware processing capability is inadequate when the original BBP bears a hotspot cell.

In the foregoing embodiment, management on the logical instances of the terminal includes maintenance of a status of the terminal, for example, activation, synchronization, and/or maintenance of information about the terminal. In addition, the management may further include modification and deletion of the logical instances.

Figure 12:
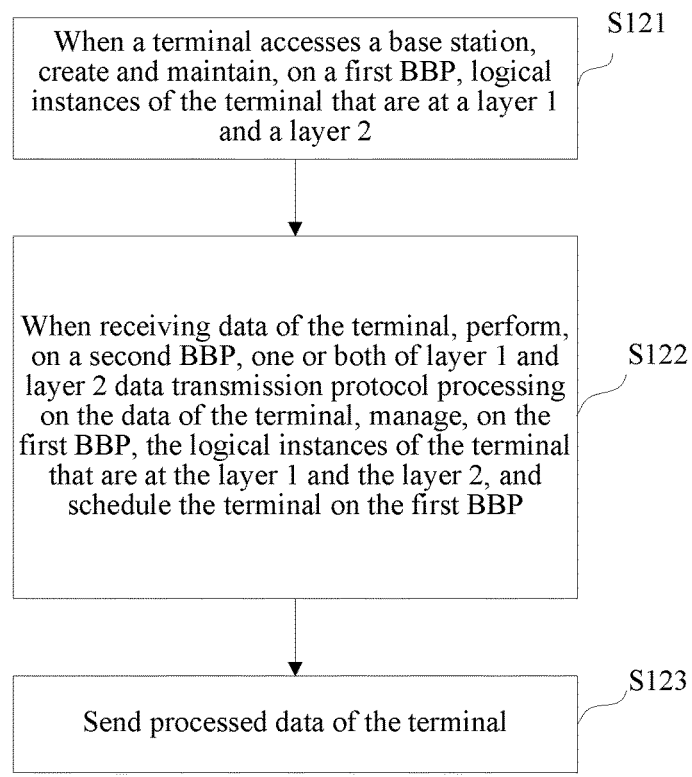
FIG. 12 is a flowchart of still another method for enhancing a processing capability of a base station according to an embodiment of the present invention.

Similar to the foregoing embodiment, when data transmission protocol processing for the terminal is migrated from the first BBP to the second BBP, scheduling on the terminal may be reserved on the first BBP. Referring to FIG. 12, a difference between this embodiment and the foregoing embodiment is that in step S112 scheduling on the terminal is reserved on the first BBP. That is, steps S121 and S123 are similar to the foregoing steps S111 and S113, and step S122 is as follows:

S122: When receiving data of the terminal, perform, on a second BBP, one or both of layer 1 and layer 2 data transmission protocol processing on the data of the terminal, reserve, on the first BBP, management on the logical instances of the terminal that are at the layer 1 and the layer 2, and reserve, on the first BBP, scheduling on the terminal, that is, manage, on the first BBP, the logical instances of the terminal that are at the layer 1 and the layer 2, and schedule the terminal on the first BBP.

The foregoing scheduling may include, for example, downlink scheduling and uplink scheduling. Downlink scheduling is used to allocate one or all of a downlink shared channel resource, a downlink control channel resource, and a downlink power resource of the terminal; uplink scheduling is used to allocate one or all of an uplink shared channel resource, an uplink control channel resource, and an uplink physical HARQ (hybrid automatic repeat request) indicator channel (physical HARQ indicator channel, PHICH) resource of the terminal.

Figure 13:
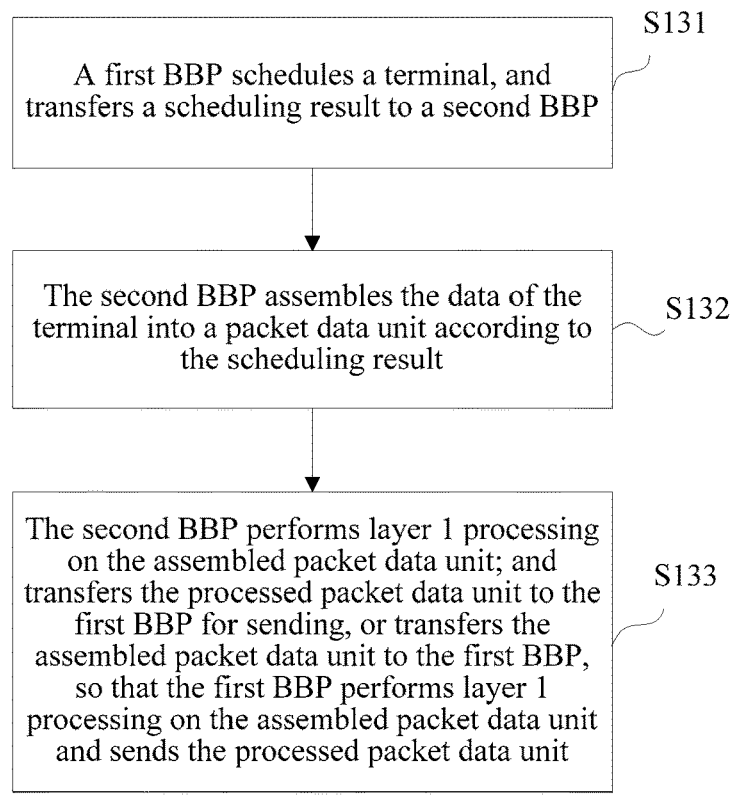
FIG. 13 is a flowchart of a method for downlink scheduling and transmission protocol processing according to an embodiment of the present invention.

When downlink scheduling is performed, downlink scheduling and data transmission protocol processing in the foregoing step S122 include steps shown in FIG. 13:

S131: The first BBP schedules the terminal, and transfers a scheduling result to the second BBP.

The scheduling result is similar to the scheduling result in the embodiment shown in FIG. 5, and is not described herein again.

S132: The second BBP assembles the data of the terminal into a packet data unit according to the scheduling result.

S133: The second BBP performs layer 1 processing on the assembled packet data unit; and transfers the processed packet data unit to the first BBP for sending, or transfers the assembled packet data unit to the first BBP, so that the first BBP performs layer 1 processing on the assembled packet data unit and sends the processed packet data unit.

It can be seen that when L1 data transmission is also migrated to the second BBP, the second BBP transmits a transport block through a PHY layer of the second BBP; when L1 data transmission is reserved on the first BBP, the second BBP transfers the transport block to the first BBP, to transmit the transport block through a PHY layer of the first BBP.

Figure 14:
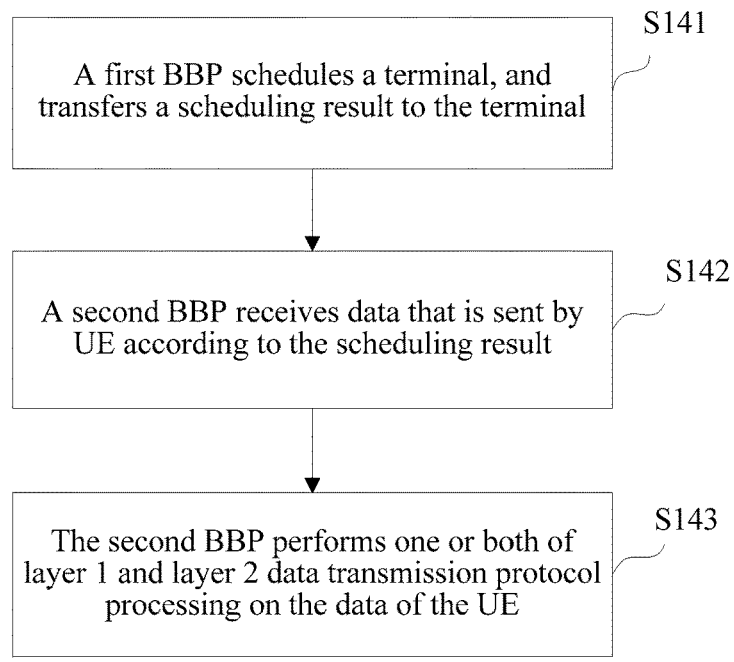
FIG. 14 is a flowchart of a method for uplink scheduling and transmission protocol processing according to an embodiment of the present invention.

When uplink scheduling is performed, uplink scheduling and data transmission protocol processing in the foregoing step S122 include steps shown in FIG. 14:

S141: The first BBP schedules the terminal, and transfers a scheduling result to the terminal.

The scheduling result is used to notify the terminal of an uplink resource used for uplink transmission, and generally, the terminal sends uplink data according to the scheduling result. The uplink data may be sent to all BBPs of the base station, where the all BBPs include the second BBP.

S142: The second BBP receives data that is sent by user equipment according to the scheduling result.

S143: The second BBP performs one or both of layer 1 and layer 2 data transmission protocol processing on the data of the user equipment.

Migration of the foregoing data transmission protocol processing may be performed dynamically, that is, when a load of the first BBP is greater than or equal to a first load threshold, all or part of data transmission protocol processing for the terminal is migrated to the second BBP. That is, before the foregoing step S122, layer 1 data transmission protocol processing and layer 2 data transmission protocol processing on the data of the terminal are performed on the first BBP; when it is detected that the load of the first BBP is greater than or equal to the first load threshold, one or both of layer 1 and layer 2 data transmission protocol processing on the data of the terminal is performed on the second BBP, where a load of the second BBP is less than or equal to a second load threshold. The first load threshold may be equal to or not equal to the second load threshold. For details, refer to the foregoing embodiments, and details are not described herein again.

After all or part of data transmission protocol processing for the terminal is migrated to the second BBP, a freed up data transmission resource may be converted into a scheduling resource, to enhance a scheduling capability of the first BBP. That is, the foregoing method may further include the following step:

converting, into scheduling resources of the first BBP, all or part of hardware resources that are used by the first BBP to perform L1 and L2 data transmission protocol processing on the data of the terminal. For details, refer to the foregoing embodiments, and details are not described herein again.

It should be noted that the terminal in the foregoing embodiment is a terminal that initially accesses the first BBP or a terminal that is handed over to the first BBP. That is, when the terminal initially accesses the first BBP or is handed over to the first BBP, a logical instance of the terminal is created on the first BBP.

Similar to the description of the foregoing embodiment, a same cell may be deployed on the first BBP and the second BBP, the terminal is in the same cell, and the first BBP and the second BBP undertake together one or both of L1 and L2 data transmission protocol processing for all terminals in the same cell, and preferably, undertake together L2 data transmission protocol processing.

Figure 15:
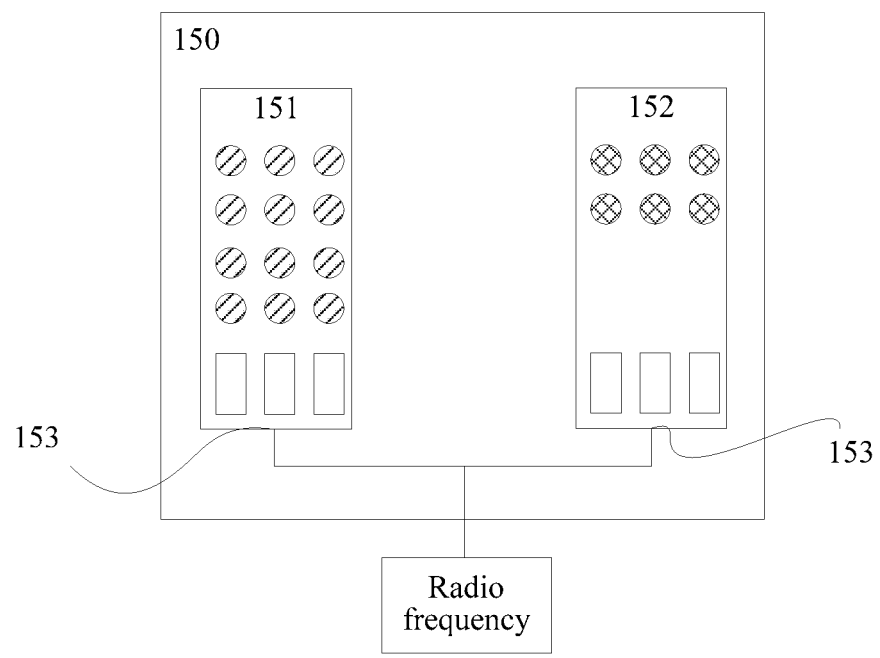
FIG. 15 is a schematic structural diagram of a baseband device according to an embodiment of the present invention.

Correspondingly, an embodiment of the present invention further provides a baseband device, configured to implement the method for enhancing a processing capability of a base station in any one of the foregoing embodiments. Referring to FIG. 15, a baseband device 150 includes at least two BBPs. Herein, for brevity, two BBPs, a first BBP 151 and a second BBP 152, are used as an example. The first BBP 151 is configured to implement operations of the first BBP in the foregoing method embodiments, and the second BBP 152 is configured to implement operations of the second BBP in the foregoing method embodiments. The baseband device 150 further includes a radio frequency interface 153, configured to connect to a radio frequency apparatus, to send processed data of a terminal.

The radio frequency interface 153 is, for example, a common public radio interface (CPRI).

Similar to the embodiment shown in FIG. 2, the baseband device 150 may further include a main control board, configured to detect loads of the at least two BBPs, and determine a first BBP and a second BBP according to the loads of the at least two BBPs; and further configured to trigger the first BBP to migrate all or part of data transmission protocol processing for the terminal to the second BBP. Certainly, the main control board may also not be disposed, and each BBP detects a load of the BBP, to determine a first BBP and a second BBP. Details are similar to those in the foregoing embodiments, and are not described herein again. Operations performed by the first BBP and the second BBP are the same as those in the foregoing embodiments, and are not described herein again.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a random access memory (RAM), a read-only memory (ROM), an electrically erasable programmable read-only memory (EEPROM), a Compact Disc-Read Only Memory (CD-ROM), or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong.

In summary, what is described above is merely exemplary embodiments of the technical solutions of the present invention, but is not intended to limit the protection scope of the present invention. Any modification, equivalent replacement, or improvement made without departing from the principle of the present invention shall fall within the protection scope of the present invention. Additionally, statements made herein characterizing the invention refer to an embodiment of the invention and not necessarily all embodiments.

What is claimed is:

1. A method for enhancing a processing capability of a base station, wherein the method comprises:
receiving, by the base station, data of a terminal;
performing, by the base station, control plane protocol processing on the terminal by using a first baseband processing board (BBP) of the base station, and performing, by the base station, all or part of data transmission protocol processing on the data of the terminal by using a second BBP of the base station; and
sending, by the base station, processed data of the terminal;
wherein performing control plane protocol processing on the terminal by using the first BBP and performing all or part of data transmission protocol processing on the data of the terminal by using the second BBP comprises:
transferring, by the second BBP, a notification message to the first BBP, wherein the notification message is used to notify the first BBP that a data transmission queue is not null;
scheduling, by the first BBP, the terminal according to the notification message, and transferring a scheduling result to the second BBP;
constituting, by the second BBP, a packet data unit according to the scheduling result; and
transferring, by the second BBP, the constituted packet data unit to a physical layer of the second BBP or the first BBP, to send the packet data unit through the physical layer of the second BBP or the first BBP.

2. The method according to claim 1, wherein before performing control plane protocol processing by using the first BBP and performing all or part of data transmission protocol processing by using the second BBP, the base station performs data transmission protocol processing on data of the terminal by using the first BBP; and when it is detected that a load of the first BBP is greater than or equal to a first load threshold, the base station performs all or part of data transmission protocol processing on data of the terminal by using the second BBP, wherein a load of the second BBP is less than or equal to a second load threshold.

3. The method according to claim 2, further comprising: converting, into scheduling resources of the first BBP, all or part of hardware resources that are used by the first BBP to perform data transmission protocol processing.

4. The method according to claim 1, wherein a cell is deployed on the first BBP and the second BBP, the terminal is in the cell, and the first BBP and the second BBP undertake together data transmission protocol processing for all terminals in the cell.

5. The method according to claim 1, wherein performing control plane protocol processing comprises: performing layer 3 protocol processing for the terminal by using the first BBP; and
wherein performing all or part of data transmission protocol processing comprises: performing one or both of layer 2 and layer 1 protocol processing on the data of the terminal by using the second BBP.

6. A baseband device, comprising:
at least two baseband processing boards (BBPs), wherein the at least two BBPs comprise a first BBP and a second BBP;
wherein the first BBP is configured to perform control plane protocol processing on a terminal served by the first BBP; and
wherein the second BBP is configured to share data transmission protocol processing for the terminal served by the first BBP;
wherein the first BBP is connected to the second BBP via an interface;

wherein the second BBP is configured to transfer a notification message to the first BBP through the interface, wherein the notification message is for notifying the first BBP that a data transmission queue is not null;

wherein the first BBP is configured to schedule the terminal according to the notification message, and transfer a scheduling result to the second BBP through the interface; and wherein the second BBP is further configured to constitute a packet data unit according to the scheduling result; and transfer the constituted packet data unit to a physical layer of the second BBP or the first BBP, for sending the packet data unit through the physical layer of the second BBP or the first BBP.

7. The baseband device according to claim 6, further comprising:
a main control board, configured to detect loads of the at least two BBPs, and determine a BBP of the at least two BBPs to be the first BBP and another BBP of the at least two BBPs to be the second BBP according to the loads of the at least two BBPs; and further configured to trigger the first BBP to migrate all or part of data transmission protocol processing for the terminal served by the first BBP to the second BBP.

8. The baseband device according to claim 7, wherein the load of the first BBP is greater than or equal to a first load threshold, and the load of the second BBP is less than or equal to a second load threshold, wherein the first load threshold is equal to or not equal to the second load threshold.

9. The baseband device according to claim 8, wherein the first load threshold and the second load threshold are preset or obtained through calculation by the at least two BBPs.

10. The baseband device according to claim 7, wherein the first BBP is further configured to convert all or part of hardware resources of the migrated data transmission protocol processing into scheduling resources of the first BBP.

11. The baseband device according to claim 6, wherein each BBP is further configured to detect a load of the respective BBP; and
wherein each BBP is further configured to determine, according to the load of the respective BBP, whether the respective BBP can be used as the first BBP configured to perform control plane protocol processing on the terminal served by the respective BBP or as the second BBP configured to share data transmission protocol processing for the terminal served by the first BBP; and when the respective BBP can be used as the first BBP, the respective BBP is further configured to migrate all or part of data transmission protocol processing for the terminal served by the respective BBP to the second BBP; or
wherein each BBP is further configured to share the detected load of the respective BBP with at least one other BBP; and at least one BBP of the at least two BBPs is further configured to determine the first BBP configured to perform control plane protocol processing on the terminal served by the first BBP and the second BBP configured to share data transmission protocol processing for the terminal served by the first BBP according to the loads of the at least two BBPs, and is further configured to trigger the first BBP to migrate all or part of data transmission protocol processing for the terminal served by the first BBP to the second BBP.

12. The baseband device according to claim 11, wherein the load of the first BBP is greater than or equal to a first load threshold, and the load of the second BBP is less than or equal to a second load threshold, wherein the first load threshold is equal to or not equal to the second load threshold.

13. The baseband device according to claim 12, wherein the first load threshold and the second load threshold are preset or obtained through calculation by the at least two BBPs.

14. The baseband device according to claim 11, wherein the first BBP is further configured to convert all or part of hardware resources of the migrated data transmission protocol processing into scheduling resources of the first BBP.

15. The baseband device according to claim 6, wherein a cell is deployed on the first BBP and the second BBP, and the first BBP and the second BBP are configured to undertake together data transmission protocol processing for all terminals in the cell.

16. The baseband device according to claim 6, wherein the control plane protocol processing comprises layer 3 protocol processing; and the second BBP is configured to share one or both of layer 2 and layer 1 protocol processing for the terminal served by the first BBP.

17. A communications system, comprising:
a base station; and
a core network device;
wherein the base station comprises a baseband device;
wherein the baseband device comprises at least two baseband processing boards (BBPs), wherein the at least two BBPs comprise a first BBP and a second BBP, wherein the first BBP is configured to perform control plane protocol processing on a terminal served by the first BBP, and wherein the second BBP is configured to share data transmission protocol processing for the terminal served by the first BBP; and wherein the base station is configured to receive data of the terminal from the terminal and send the data, having been processed by the baseband device, to the core network device; or receive data of the terminal from the core network device and send the data, having been processed by the baseband device, to the terminal;

wherein the first BBP performing control plane protocol processing on the terminal and the second BBP sharing data transmission protocol processing for the terminal comprises:
transferring, by the second BBP, a notification message to the first BBP, wherein the notification message is used to notify the first BBP that a data transmission queue is not null;
scheduling, by the first BBP, the terminal according to the notification message, and transferring a scheduling result to the second BBP;
constituting, by the second BBP, a packet data unit according to the scheduling result; and
transferring, by the second BBP, the constituted packet data unit to a physical layer of the second BBP or the first BBP, to send the packet data unit through the physical layer of the second BBP or the first BBP.

* * * * *